UNITED STATES PATENT OFFICE.

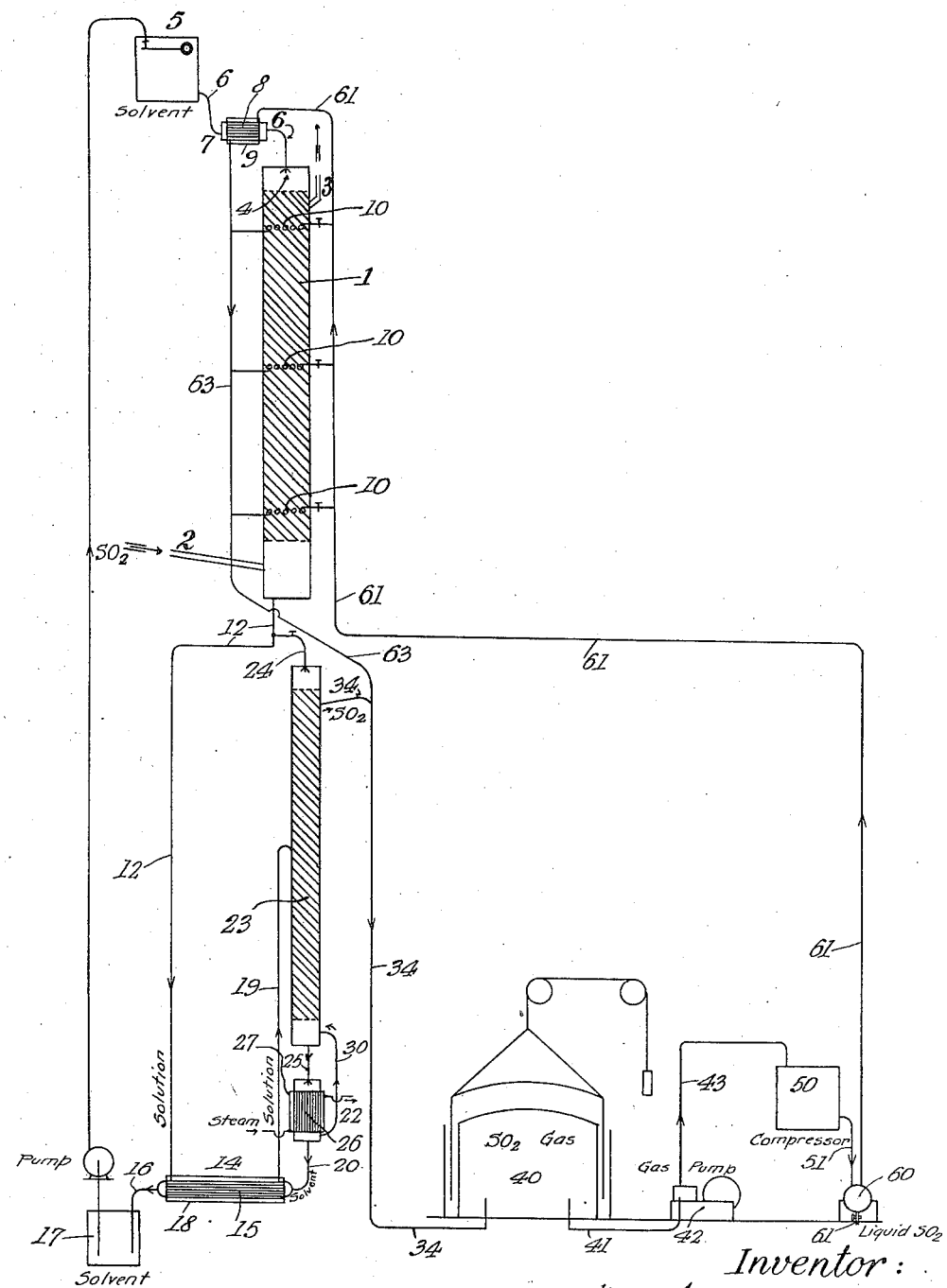

MAX KALTENBACH, OF PARIS, FRANCE.

MANUFACTURE OF SULFUROUS ANHYDRID.

1,260,681.                    Specification of Letters Patent.    Patented Mar. 26, 1918.

Application filed July 21, 1917. Serial No. 182,090.

*To all whom it may concern:*

Be it known that I, MAX KALTENBACH, a citizen of the Republic of France, residing in Paris, France, have invented certain new and useful Improvements in the Manufacture of Sulfurous Anhydrid, of which the following is a specification.

Sulfurous anhydrid is commonly made by dissolving in water the diluted sulfurous acid gas derived from the combustion of sulfur and subsequently heating the solution to liberate the sulfurous anhydrid which is then liquefied by compression after it has been dried.

Since the solubility of diluted sulfurous acid gas is small, it is necessary to use considerable quantities of water equivalent in practice to more than 100 times the weight of the anhydrid made. The solution ought then to be heated to 100° C. and, in spite of heat interchangers, the consumption of fuel is very important.

The manipulation of large quantities of liquid requires bulky apparatus which make the installations costly and cumbersome. There would, therefore, be great advantage if solvents could be used having a greater capacity for absorbing the sulfurous acid gas than water has.

The alcohols are just such solvents and ethylalcohol in particular presents the following advantages:—

Its specific heat is low, its ignition point is high, its boiling point 20° lower than that of water.

Its power of absorbing sulfurous anhydrid increases rapidly as the temperature is lowered until it mixes with the anhydrid in all proportions at about 10° C.

It is cheap and does not attack the usual metals.

Sulfurous anhydrid is a practicable and frequently used agent for producing cold.

The present invention applies these several properties to a manufacture of sulfurous anhydrid based on the dissolution of sulfurous acid gas in an alcohol at a low temperature. A part of the anhydrid produced is used for the purpose of lowering the temperature to that necessary and this feature of the invention is applicable whatever solvent is used so that solvents become available which are volatile at ordinary temperatures.

In the accompanying diagram numeral 1 designates a percolating column for absorbing diluted sulfurous acid gas, which gas coming from any suitable sulfur burner, is introduced into the column 1 by means of a pipe 2. The gases are preliminarily cooled by any known means.

The inert gases which are not absorbed in the column 1, escape into the atmosphere through a pipe 3 at the upper part of the column 1. The column 1 is provided at its upper part with a nozzle 4 for introducing, in the form of a spray, the liquid for dissolving the $SO_2$ gas. 5 is a vat for the solvent. The solvent flows from the vat 5 to the column 1 through a pipe 6. Preferably, the solvent passes through a refrigerator 7. The refrigerator 7 may comprise a tube system 8, through which the liquid solvent passes, and a jacket 9 surrounding the tube system, through which the refrigerating medium, such as a liquid $SO_2$ producing cold by evaporating in the jacket, passes.

The heat evolved by the absorption of the sulfurous acid gas in the column 1 may be absorbed by one or more refrigerating coils 10, which may be supplied with liquid $SO_2$ as the refrigerant.

The cooled saturated $SO_2$ solution flows out of the column 1 through the pipe 12, and passes to a boiler 22, preferably, however, first passing through a heat interchanger 14. The heat interchanger 14 may comprise a tube system 15, through which hot solvent flowing from the boiler 22 through the pipe 20, passes, the solvent passing out of the tube system 15 through the pipe 16 and emptying into a tank 17 for receiving the regenerated solvent. The heat interchanger 14 also comprises a jacket 18 around the tube system 15, through which jacket the solution flowing from the column 1 via the pipe 12 passes, and absorbs heat from the tube system 15. The $SO_2$ solution (from which some of the gas has been freed from solution by the heat) passes out of the jacket 18 via the pipe 19.

The solution and free $SO_2$ gas in the pipe 19 preferably flows into a cooling column 23 at a point about midway thereof. The cooling of the gas is preferably effected by cold saturated solution from the column 1, a part of the cold saturated solution flowing from the column 1, being introduced into the top of the column 23 through a pipe 24.

The warm solution entering the column 23 through the pipe 19, and also the part of the solution which enters through the pipe 24, flows downwardly in the column 23 to the steam boiler 22 through a pipe 25. The boiler 22 comprises a tube system 26 into which the solution from the pipe 25 flows, and around this tube system there is a steam jacket 27. The boiler 22 acts to drive off the $SO_2$ gas from the boiler, the $SO_2$ gas leaving by the pipe 30 and exchanging heat with the solution flowing downwardly in the column 23. The $SO_2$ gas in the column 23 becomes cooled in proportion as it rises therein, and leaves the column 23 by way of the pipe 34, at the same temperature as that of the saturated solution entering by way of the pipe 24; the gas is thus unable to carry away the vapor of the solvent, since the vapor tension of the solvent is very low at the temperature in question.

The solvent, freed from the gas, leaves the boiler 22 by the pipe 20, flows into the heat interchanger 14, and finally into the tank 17 for the reception of the regenerated solvent, from whence it is pumped to the tank 5, and enters the absorption column 1, as hereinbefore described.

The gas leaving the column 23 through the pipe 34 flows into a gas tank or holder 40.

A pump 42 may be employed for drawing the gas from the tank 40, via pipe 41, and forces it into a compressor 50 via pipe 43, the gas being liquefied in the compressor 50, and flowing via pipe 51 into the liquid gas reservoir 60. The liquid gas may be drawn off through a pipe 61. The liquid $SO_2$ which expands in the coils 10 in the column 1, and in the tube system 8 in the cooler 7, flows from the tank 60 through the pipe 61. The gas escaping from the coils 10, and from the tube system 8 in the cooler 7, flows via the pipe 63 to the pipe 34, through which it flows to the gas holder 40 along with gas coming from the column 23.

Inasmuch as the system is maintained at a very low temperature and is suitably insulated, the vapor tension of the solvent is negligible and losses by vaporization are insignificant. The volume of liquid in circulation and the quantity of heat expended are small. The dimensions of the apparatus are very much reduced as compared with those of a system using water as a solvent.

Having thus described my invention and the best means I know of carrying the same into practical effect, I claim:—

1. A process for manufacturing sulfurous anhydrid, which process consists in absorbing diluted sulfurous acid gas in an alcohol at a low temperature, and then heating the alcoholic solution and collecting the anhydrid expelled by the heating.

2. A process for manufacturing sulfurous anhydrid, which process consists in absorbing diluted sulfurous acid gas in ethyl alcohol at a low temperature, then heating the alcoholic solution so as to expel the anhydrid therefrom.

3. A process for manufacturing sulfurous anhydrid, which process consists in cooling ethyl alcohol by means of liquid sulfurous anhydrid, causing the cooled alcohol to absorb diluted sulfurous acid gas, heating the alcoholic solution of sulfurous anhydrid thus produced and liquefying the expelled sulfurous anhydrid, a part whereof is used to cool the alcohol as aforesaid.

4. A process for manufacturing sulfurous anhydrid, which process consists in cooling ethyl alcohol by means of liquid sulfurous anhydrid, causing the cooled alcohol to absorb diluted sulfurous acid gas, heating the alcoholic solution thus obtained to expel the sulfurous anhydrid, causing the heated solvent to impart its heat to the solution about to be heated, and causing sulfurous anhydrid liberated by the heat to be cooled by some of the solution which is to be heated and liquefying the sulfurous anhydrid, a part of which is used to cool the alcohol as aforesaid.

5. A process for manufacturing sulfurous anhydrid, which process consists in passing ethyl alcohol through a refrigerator cooled by the evaporation of liquid sulfurous anhydrid and through a column up which diluted sulfurous acid gas is passing, cooling the said column by vaporization of liquid sulfurous anhydrid in refrigerating pipes therein, passing the main portion of the solution of sulfurous anhydrid thus obtained through the heat interchanger hereinafter named, passing the rest of the said solution through a heating column, causing the solution flowing from the said heat interchanger to enter the said column at its middle height, passing the heated liquid through the said heat interchanger, collecting the sulfurous anhydrid expelled as gas in the said heating column and the gaseous sulfurous anhydrid proceeding from the said refrigerator and refrigerating pipes, liquefying the sulfurous anhydrid thus collected, supplying a portion of the liquefied anhydrid to the said refrigerator and refrigerating pipes and returning the alcohol flowing from the said heat interchanger to the said refrigerator.

It witness whereof I have hereunto signed my name in the presence of two subscribing witnesses.

MAX KALTENBACH.

Witnesses:
CHAS. P. PRESSLY.
HENRI CARTIER.